B. KERN.
FILTER ATTACHMENT FOR STREET SWEEPERS.
APPLICATION FILED NOV. 19, 1914.
1,288,027.
Patented Dec. 17, 1918.
2 SHEETS—SHEET 1.
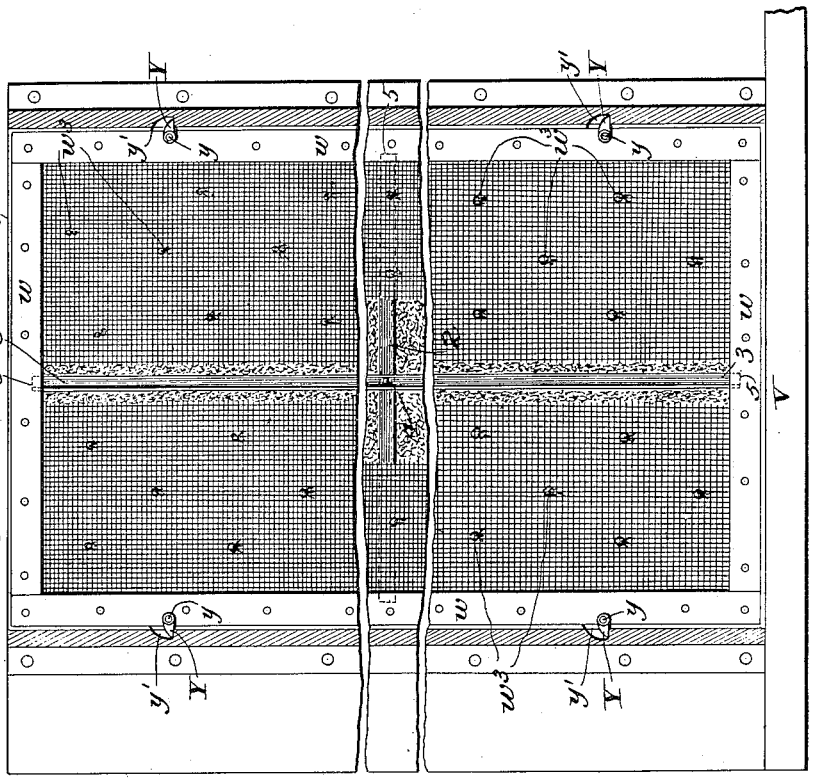
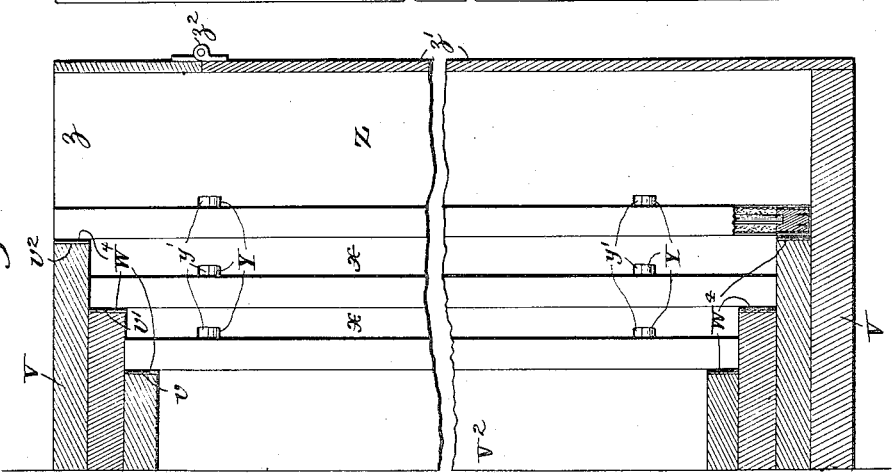
Witnesses:
Jas E Hutchinson
G. Hedemeier
Inventor:
Bernard Kern,
By
Attorneys B. KERN.
FILTER ATTACHMENT FOR STREET SWEEPERS.
APPLICATION FILED NOV. 19, 1914.
1,288,027.
Patented Dec. 17, 1918.
2 SHEETS—SHEET 2.
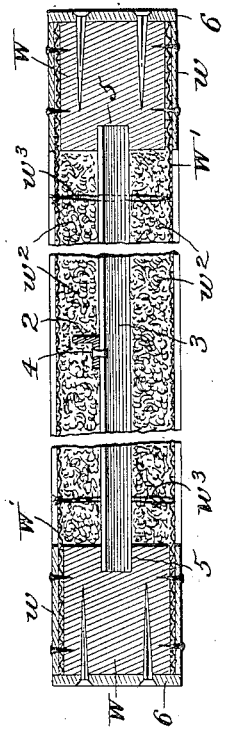
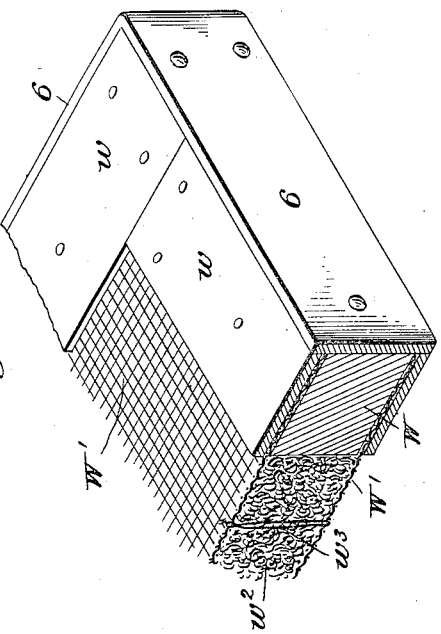
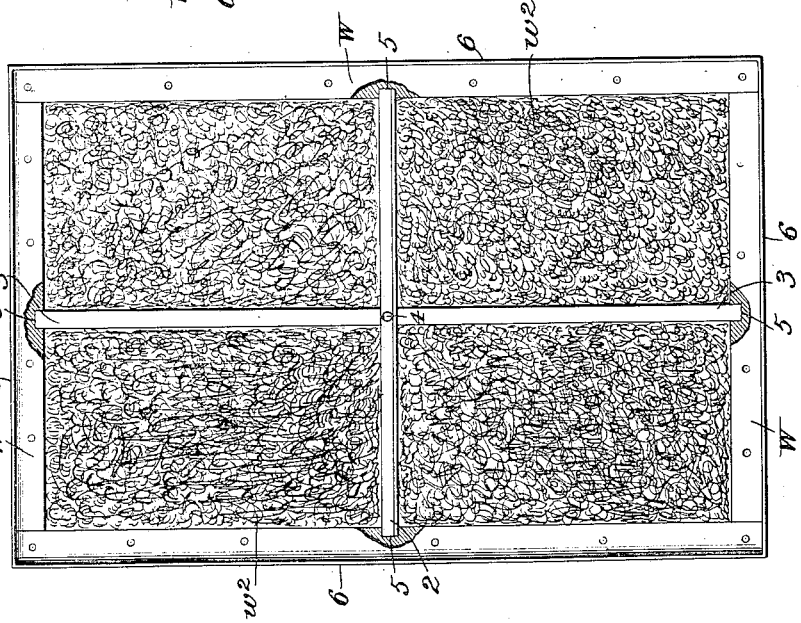
Witnesses:
Jas E Hutchinson
G. Wedemeier
Inventor:
Bernard Kern,
By
Attorneys

UNITED STATES PATENT OFFICE.

BERNARD KERN, OF SANDUSKY, OHIO.

FILTER ATTACHMENT FOR STREET-SWEEPERS.

1,288,027.　　　　　Specification of Letters Patent.　　Patented Dec. 17, 1918.

Application filed November 19, 1914. Serial No. 873,006.

*To all whom it may concern:*

Be it known that I, BERNARD KERN, a citizen of the United States, residing at Sandusky, in the county of Erie and State of Ohio, have invented certain new and useful Improvements in Filter Attachments for Street-Sweepers, of which the following is a specification, reference being had therein to the accompanying drawing.

This case is a continuation in part of my pending application covering an improvement in street sweeping machines filed August 5, 1913, Serial No. 783220, from which certain subject matter incorporated herein, has been divided.

The present invention relates to an improvement in dust filters which, though adapted for use in many connections, is especially useful in connection with street sweeping machines, particularly where, as in my above mentioned application, air is employed for conveying the refuse collected through a dust separator and to a convenient place of deposit.

Of course where air is employed, as suggested, it is necessary to provide an outlet to the atmosphere for the air after it has performed its function of delivering or discharging the dust or refuse carried thereby in connection with a dust collector, which latter need not be illustrated or specifically described herein in view of the fact that it is with the air that leaves the dust collector that the present invention deals, and which air obviously, must be in as pure a state as possible at the time of its final discharge exteriorly of the machine.

With the foregoing in mind, the invention may be said to consist of a filter through which air initially treated by a main separator is forced to pass, and through the medium of which filter any minute particles of dust escaping said separator will be taken from the air, so that the latter as finally discharged into the atmosphere is substantially pure from dust.

A convenient and practical embodiment of the invention embraces an improved body formation of the filter itself, both as to its elements and simple construction, and the same in combination with means for movably assembling the parts to facilitate the cleaning and substitution of other parts at the will of the operator.

In the drawings, wherein the preferred embodiment of the invention is illustrated and upon an inspection of which in connection with the detailed description hereinafter contained, the improvements will be clear, Figure 1 is a vertical sectional view through the filter and associated parts of the street sweeping machine, Fig. 2 is a sectional view at right angles to the section of Fig. 1, Fig. 3 is a face view of one of the filter parts, Fig. 4 is a transverse section thereof, and Fig. 5 is a detail perspective, partly in section.

Referring more specifically to the drawings wherein like reference characters designate corresponding parts in the several views, it will be observed that I provide a filter frame V adapted to be mounted upon the outside of a street sweeping machine and adapted to open as at $V^2$ to the dust box of the machine. This filter frame is of step-like formation to provide the outwardly progressively enlarging seats $v$, $v'$ and $v^2$ for the accommodation of filter sections of similarly increasing diameters. The filter sections are of like construction, differing only as to size and are disposed, as shown, to provide vertically disposed collecting spaces, $x$ therebetween.

Each filter section comprises a surrounding wooden frame W secured against the opposite surfaces of which are foraminated sheets of material, conveniently wire gauze $W'$ interposed between the frame and fastening strips $w$ tacked to the frame; the wire gauze being spaced to provide a chamber for the reception of a suitable non-absorbent material such as moss $w^2$ capable of arresting the minute particles of dust carried by the outgoing air, the latter being compelled to pass through the various filter sections prior to its final discharge. The moss is prevented from undue displacement within the filter racks by means of wire loops or equivalent ties $w^3$ passing through the moss at a number of points and secured to the foraminated seats, readily accomplished by merely threading the wire through said seats to constitute loops.

Y are gravity dogs or latches, pivoted at $y$ to the side members of the filter frames W and adapted to be swung into engagement with notched portions $y'$ of the end walls of the supporting frame V.

Beyond the walls of the filter sections, an air space Z is provided in the frame V,—this frame being closed at its bottom ends and normally at its front,—which said air space opens to discharge upwardly, as at $z$, to prevent the air blast being projected laterally of the machine in the case of a street sweeper, which naturally would be objectionable in many respects to persons passing the machine and relative to merchandise displayed on sidewalks, etc.

Access to the space Z, as well as to the moss racks is obtained through a front door $z'$ normally closed as stated, as illustrated in full lines, but adapted to be swung open upon a hinged connection $z^2$. By opening this door it is apparent that the racks may be properly adjusted in place, the latches Y manipulated to fasten or unfasten the racks and the racks withdrawn and replaced or others substituted for the same. The smaller rack or racks may at times be withdrawn through the door opening, but the size of the final outlet opening $z$ is such that any or all of the racks, though of larger size, may be introduced or withdrawn in a vertical direction therethrough.

Sheep's wool pelt packing, found particularly useful in the dust-sealing of the various other portions of my improved machines or heavy felt is interposed between the filter frames W and their seats $v$, $v'$ and $v^2$ respectively, as indicated at $w^4$.

I have referred to the desirability of withdrawing the moss racks for the purpose of cleansing the same and in order to permit of their being expeditiously washed and shaken I will now refer to features of the construction which tend materially to that end. I have found that the most efficient way of cleaning the racks is by subjecting the same to the action of a water hose and to permit the use of water for that purpose I employ in the construction of the moss racks what is known as southern moss, which is substantially non-absorbent, and though dense and bearing throughout a fine fiber, rendering it especially useful as a filter for dust, will permit water to freely wash therethrough and carry out the collected dust without said water being materially taken up by the moss.

While a simple frame, such as that heretofore described, may be efficient in many instances, yet to enable the frame to be shaken by rocking or jarring the same on its edges or corners, I preferably reinforce the frame by crossed tie bars 2 and 3 of angle metal riveted together at their crossing point at the center of the rack, as indicated at 4, and secured in any practical way to the frame W, as by projecting the ends of the bars into suitable seats 5 provided therefor, these tie bars being arranged centrally of the moss filling and completely embedded by the latter, best seen in Fig. 4. The frame is further strengthened by entirely surrounding the same with a metallic band 6, secured to the frame W, and overlapping at its edges, the outer marginal portions of the foraminated sheets $w'$ and their fastening strips $w$.

While I have herein disclosed the preferred embodiment of the invention, it will be understood by persons skilled in the art that said invention is capable of embodiment in other forms and devices without departing from the spirit thereof and as made in accordance with the hereto appended claims.

Having thus described the invention, what is claimed is:

1. A filter rack of the character described comprising a frame, foraminated sheets spaced apart and resting against opposite surfaces of the frame, strips overlying the foraminated sheets and secured to the frame to fasten the sheets therebetween, and a filter filling in the space between the sheets, the frame being provided with means projecting therefrom a slight distance in opposite directions to protect the marginal edges of the sheets and fastening strips, said means consisting of a separate reinforcing band facing said marginal edges of the sheets and the frame to reinforce the same.

2. In a dust collecting machine, a frame having suitable bearing surfaces in series and an opening in the upper portion thereof, a filter comprising a plurality of removable filter racks closely associated to provide collecting spaces therebetween, in combination with means for securing the racks facewise against the said bearing surfaces, said bearing surfaces and racks being arranged in stepped relation, all of said racks being removable through the top opening and the front portion of the same also being formed to facilitate removal of the racks through said opening, without removing portions of the frame, substantially as described.

3. A filter rack of the character described, comprising a frame having a relatively wide air outlet opening in its upper end, a filter rack within the frame the said rack being adapted normally to be placed within the frame beyond said opening and to be removed therefrom through said opening.

4. In a dust collecting machine, a frame having suitable bearing surfaces, and an open upper portion at one end, a filter comprising a plurality of removable filter racks secured against the bearing surfaces in spaced relation, the front of the frame being spaced from the foremost filter rack to facilitate the removal of the filter racks and direct the filtered air through the open upper portion of the frame.

5. In a dust collecting machine, a frame having a suitable bearing surface and an opening in the upper portion thereof at one end, a filter removably fitted against said bearing surface and spaced from the front portion of the frame to facilitate the removal of the rack and direct the filtered air outwardly through the opening in the upper portion of the frame.

6. In a dust collecting machine, a frame having a suitable bearing surface and a relatively wide opening in its upper portion at one end, a filter comprising a plurality of removable filter racks secured against said bearing surfaces in spaced relation, the front portion of the frame being spaced from the foremost filter rack and movable to facilitate the removal of the racks, the front portion also being adapted to direct the air passing through the filters outwardly through the opening in the upper portion of the frame.

7. In a dust collecting apparatus the combination of a suitable frame having spaced bearing surfaces to provide filter receiving spaces of different proportions, filters arranged in said spaces against said bearing surfaces and spaced from one another to provide collecting chambers, said frame being provided with a substantially unobstructed air opening in one edge arranged forwardly of the foremost filter and connecting with a space in front of said foremost filter whereby to facilitate the removal of the filters, and the front wall of the frame being also constructed to facilitate the said removal of the filters.

8. In a dust collecting machine the combination of a frame having an open back for communication with a dust box or the like and a front wall with a movable section, said frame having spaced stepped bearing surfaces to provide receiving spaces for filters of different diameters with the filters of increasing diameters toward the front wall, filters positioned within the frame against said bearing surfaces, and said frame having a substantially unobstructing space between the foremost filter and front wall, which said space communicates with a substantially unobstructed opening in an edge of said wall which said edge wall opening is of a size to permit removal and assembly of said filters at will.

9. In a dust collecting machine, the combination of a frame opening at its back and having a normally closed opening in the front wall thereof adapted to be exposed at will, a supporting bearing surface on the frame, a removable filter member positioned within the frame against said bearing surface, said filter member having a body portion of dense non-absorbent material with embedded anchoring means, said filter being spaced from the front wall of the frame by a non-obstructed space and the top wall above the space having opening communicating with said space and of a size to permit continuous outlet for air at this point or the removal of the filter therethrough at will.

10. A filter rack of the character described comprising an open border or frame, foraminated sheets secured to opposite sides of the frame forming an intermediate space, a filling of dense non-absorbent dust collecting moss disposed between said sheets to arrest the dust carried by the air passing through the filter, an angle bar projecting through the space between the top and bottom of the frame and embedded at its ends in the latter, a transversely extending angle bar extending through the space between the plates secured to the first mentioned angle bar and embedded at its ends in the sides of the frame, said filling completely surrounding said angle bars, and a plurality of independent intermediate anchoring means projecting through the filling material and secured to said plates.

In testimony whereof I hereunto affix my signature in the presence of two witnesses.

BERNARD KERN.

Witnesses:
 A. J. HENDRICKSON,
 EMMETT MARTIN.